US008776205B2

(12) United States Patent
Alrabady et al.

(10) Patent No.: US 8,776,205 B2
(45) Date of Patent: Jul. 8, 2014

(54) SECURE CONNECTION SYSTEMS AND METHODS FOR VEHICLES

(75) Inventors: Ansaf I. Alrabady, Livonia, MI (US); Salvatore G. Trupiano, Troy, MI (US); John Patrick S. Gonzaga, Macomb, MI (US)

(73) Assignee: GM Global Technology Operations LLC

( * ) Notice: Subject to any disclaimer, the term of this patent is extended or adjusted under 35 U.S.C. 154(b) by 502 days.

(21) Appl. No.: 12/953,918

(22) Filed: Nov. 24, 2010

(65) Prior Publication Data

US 2012/0110654 A1 May 3, 2012

Related U.S. Application Data

(60) Provisional application No. 61/408,189, filed on Oct. 29, 2010.

(51) Int. Cl.
*H04L 29/06* (2006.01)

(52) U.S. Cl.
USPC ............................................ 726/10; 713/176

(58) Field of Classification Search
CPC ............... G06Q 30/02; G06Q 10/0639; H04L 2209/84; H04L 2209/80; H04L 63/0823; H04L 9/3263; H04L 63/10; H04L 41/0803; H04L 65/1063; H04L 67/125
See application file for complete search history.

(56) References Cited

U.S. PATENT DOCUMENTS

| | | | |
|---|---|---|---|
| 2003/0126131 A1* | 7/2003 | Cihula et al. ...................... 707/9 |
| 2008/0040738 A1* | 2/2008 | Okamoto et al. ................ 725/25 |
| 2008/0104401 A1* | 5/2008 | Miyamoto et al. .............. 713/175 |
| 2009/0083537 A1* | 3/2009 | Larsen et al. ................... 713/153 |
| 2009/0138942 A1* | 5/2009 | Alrabady et al. ................... 726/4 |
| 2009/0249074 A1* | 10/2009 | Madhavan et al. ............. 713/176 |
| 2010/0169963 A1* | 7/2010 | Kleinpeter et al. .............. 726/10 |
| 2012/0030470 A1* | 2/2012 | Jdanov et al. .................. 713/176 |

* cited by examiner

*Primary Examiner* — Oscar Louie
*Assistant Examiner* — Hao Nguyen

(57) ABSTRACT

A communication system of a vehicle includes a mode determination module and a connection control module. The mode determination module sets a mode of operation to one of a first mode and a second mode based on a comparison of a common name (CN) of a root certificate with first and second predetermined CNs associated with operation in the first and second modes, respectively. The connection control module selectively transmits a request to one of a first server and a second server to establish a secure wireless connection between the connection control module and the one of the first and second servers. The first and second servers are different, and the first and second predetermined CNs are different.

20 Claims, 3 Drawing Sheets

SECURE CONNECTION SYSTEMS AND METHODS FOR VEHICLES

CROSS-REFERENCE TO RELATED APPLICATIONS

This application claims the benefit of U.S. Provisional Application No. 61/408,189, filed on Oct. 29, 2010. The disclosure of the above application is incorporated herein by reference in its entirety.

FIELD

The present disclosure relates to vehicle communications and more particularly to systems and methods for establishing a secure wireless connection between a vehicle and a server.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an internal combustion engine and/or one or more electric motors that generate torque. A transmission selectively transfers torque to one or more wheels of the vehicle. An engine control module (ECM) controls operation of the engine. The ECM or another control module, such as a motor control module, may control an electric motor. A transmission control module (TCM) controls the transmission. The vehicle may also include one or more other control modules, such as a chassis control module, etc.

The control modules may communicate with one another via a network that can be referred to as a car area network (CAN). The control modules may communicate, for example, to share data. One or more of the control modules may make a decision and/or take action based on the shared data.

The vehicle also includes a communications module that is connected to the car area network. The communications module may also selectively establish a connection to a remote server. The communications module may update one or more of the control modules based on data from the remote server. The communications module may selectively output one or more vehicle parameters to the remote server.

SUMMARY

A communication system of a vehicle includes a mode determination module and a connection control module. The mode determination module sets a mode of operation to one of a first mode and a second mode based on a comparison of a common name (CN) of a root certificate with first and second predetermined CNs associated with operation in the first and second modes, respectively. The connection control module selectively transmits a request to one of a first server and a second server to establish a secure wireless connection between the connection control module and the one of the first and second servers. The first and second servers are different, and the first and second predetermined CNs are different.

A communication method for a vehicle, includes: setting a mode of operation to one of a first mode and a second mode based on a comparison of a common name (CN) of a root certificate with first and second predetermined CNs associated with operation in the first and second modes, respectively; and selectively transmitting a request to one of a first server and a second server to establish a secure wireless connection between a connection control module of the vehicle and the one of the first and second servers. The first and second servers are different, and the first and second predetermined CNs are different.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
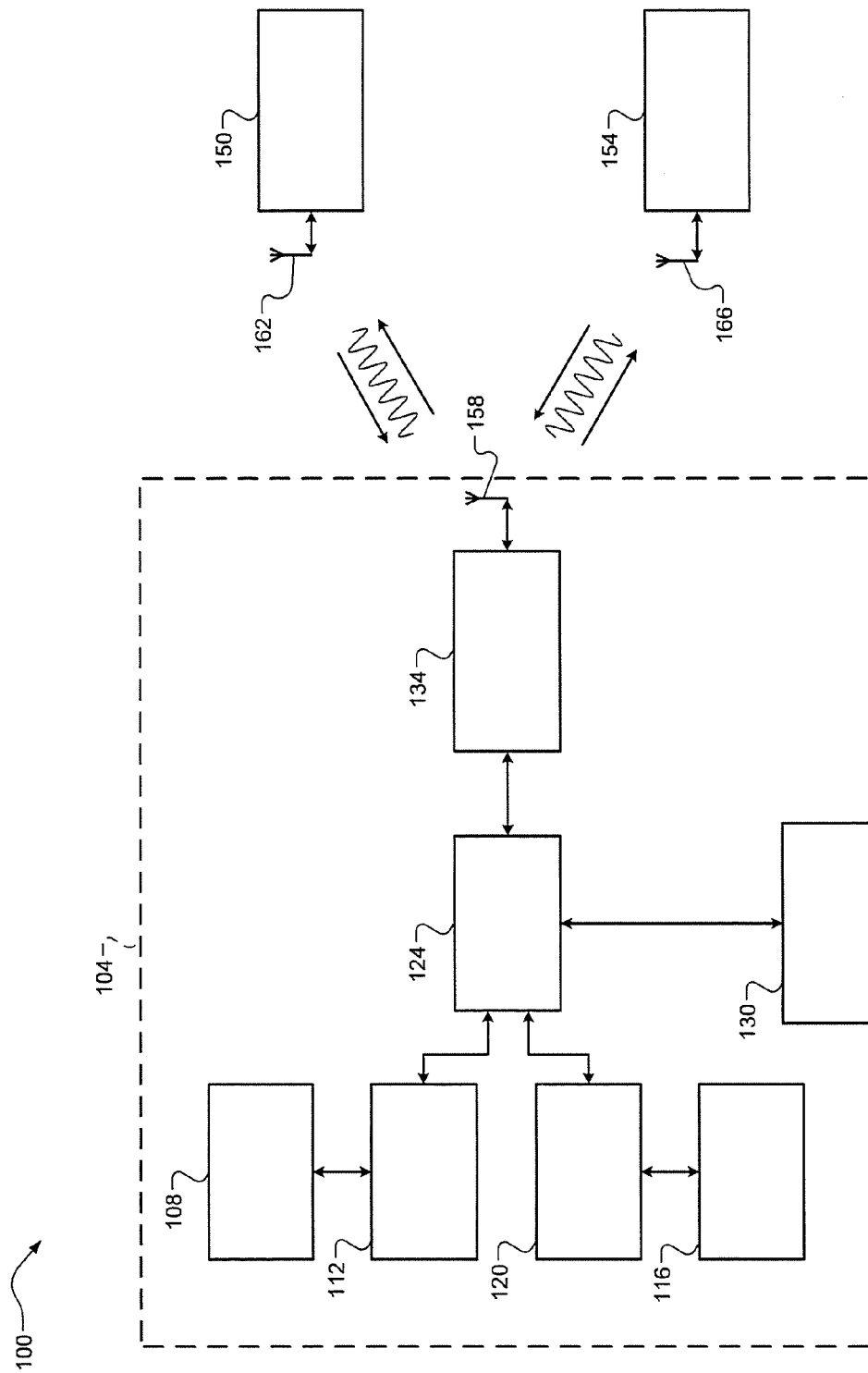
FIG. 1 is a functional block diagram of an example vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A vehicle includes a communications module that can communicate wirelessly with two or more servers, such as a first server and a second server. The communications module selectively attempts to establish a secure connection between the communication module and a server. The communications module transmits a request to establish a secure connection to the server. The server transmits a server certificate back to the communication module. The communications module may verify that the server certificate is valid via an identified certificate authority (CA).

The server certificate includes an issuer common name (CN) and a subject CN. The communications module determines whether to continue with the process of establishing a secure connection based on a comparison of the server certificate's issuer and subject CNs with a set of predetermined issuer and subject CNs. The communications module may continue the process of establishing a secure connection when the server certificate's issuer and subject CNs are the same as the predetermined issuer and subject CNs. Conversely, the communications module may discontinue the process of establishing a secure connection when the server certificate's issuer CN and/or the server certificate's subject CN is different than the predetermined issuer and/or subject CNs.

The communications module of the present disclosure selects the set of predetermined issuer and subject CNs from a plurality of sets of predetermined issuer and subject CNs. Each set includes one predetermined issuer CN and one predetermined subject CN. The communications module selects the set from the plurality of sets based on a current mode of operation. For example only, the communications module selects a first set when the current mode is a first mode and selects a second set when the current mode is a second mode.

Referring now to FIG. 1, a functional block diagram of an example vehicle system 100 is presented. A vehicle 104 includes an engine 108, an engine control module (ECM) 112, a transmission 116, and a transmission control module (TCM) 120. The vehicle 104 may include one or more electric motors and/or motor generator units (not shown). While not shown, the vehicle 104 may include one or more other control modules, such as a chassis control module, a hybrid control module, etc. The control modules of the vehicle 104, including the ECM 112 and the TCM 120, may communicate and share data via a network bus 124.

Software that the control modules of the vehicle 104 execute may be loaded to each of the control modules via an input/output (I/O) interface 130. For example only, a computer (not shown) may load the software to the vehicle 104 via the I/O interface 130. The connection to the I/O interface 130 may be wireless or wired. The ECM 112 controls the engine 108 using software loaded via the I/O interface 130, the TOM 120 controls the transmission 116 using software loaded via the I/O interface 130, etc. A communications module 134 controls communication between the vehicle 104 and one or more servers using software loaded via the I/O interface 130.

The communications module 134 selectively communicates with the control modules of the vehicle 104 via the network bus 124. The communications module 134 also selectively communicates with a first server 150 and a second server 154. The first and second servers 150 and 154 can be referred to as a production server and a development server, respectively. For example only, the first server 150 may be an OnStar server. The communications module 134 may also selectively communicate with one or more other servers (not shown).

The communications module 134 communicates with the first server 150 and the second server 154 wirelessly. The communications module 134 wirelessly transmits and receives data via a first antenna 158. The first server 150 wirelessly transmits and receives data via a second antenna 162. The second server 154 wirelessly transmits and receives data via a third antenna 166.

A root certificate (see FIG. 2) is stored in memory of the vehicle 104. For example only, the root certificate may be stored in memory of the communications module 134. The communications module 134 determines a current mode of operation based on a predetermined portion of the root certificate. The current mode may include a first mode (e.g., a production mode) and a second mode (e.g., a development mode). For example only, the predetermined portion of the root certificate may be a common name (CN) entry of a predetermined data string of the root certificate. The predetermined data string of the root certificate may be an issuer data string or a subject data string.

The communications module 134 may determine that the current mode is the first mode when the CN entry of the predetermined data string is the same as a predetermined first mode entry. The communications module 134 may determine that the current mode is the second mode when the CN entry of the predetermined data string is the same as a predetermined second mode entry. The predetermined first mode entry is different than the predetermined second mode entry.

The CN entry of the predetermined data string is set to the predetermined second mode entry before the vehicle 104 is made available for use in public (e.g., during vehicle development and testing). The CN entry of the predetermined data string may later be set to the predetermined first mode string, such as when the vehicle 104 is deemed ready for use in public (e.g., after vehicle development and testing). A vehicle manufacturer may set and reset the CN entry of the predetermined data string via the I/O interface 130. The labels of first and second mode may not be indicative of an order in which the first and second modes may be experienced.

The communications module 134 may communicate with the first server 150 when the current mode is the first mode. The communications module 134 may communicate with the second server 154 when the current mode is the second mode. The communications module 134 may communicate with another server (not shown) when the current mode is another mode.

Figure 2:
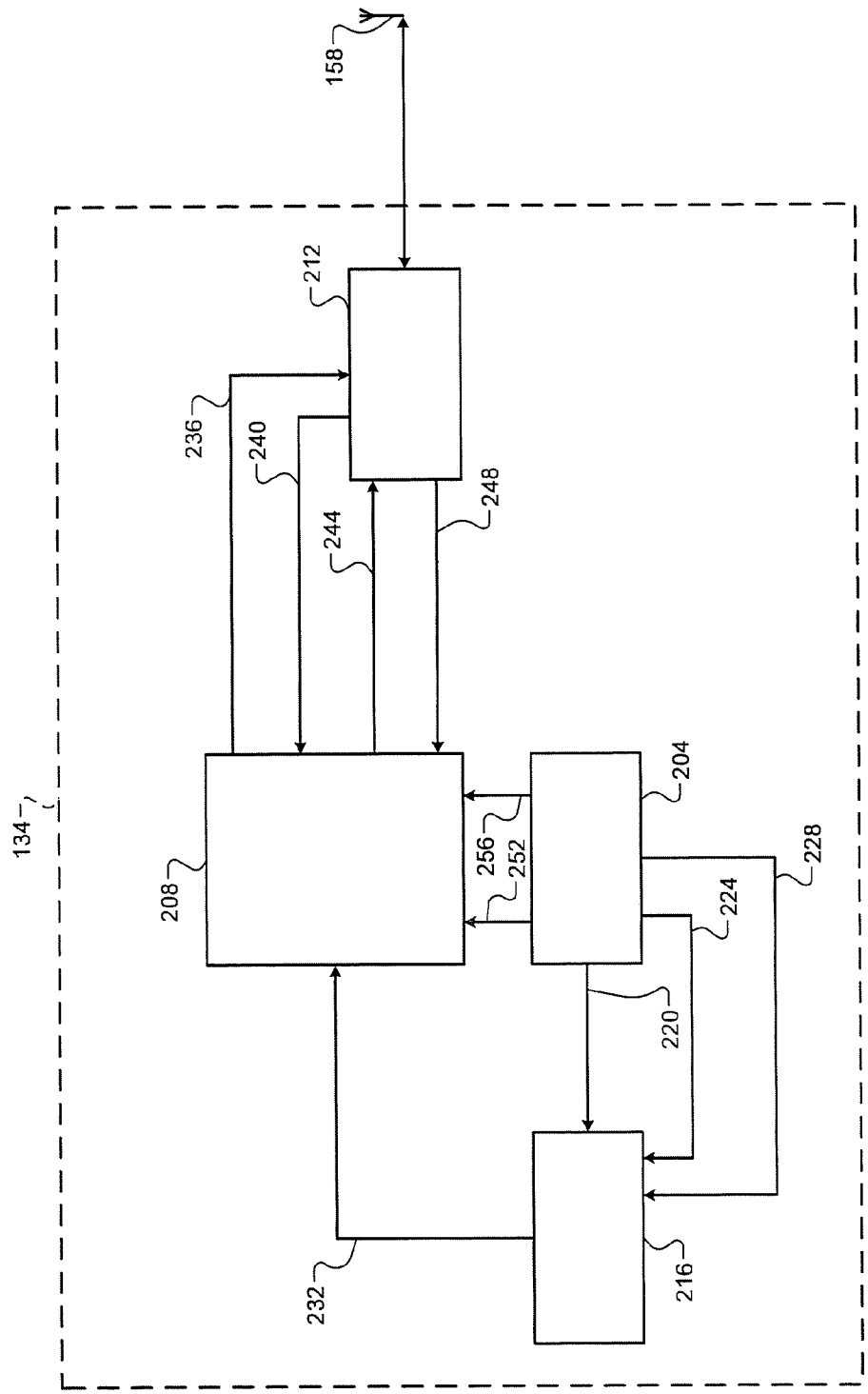
FIG. 2 is a functional block diagram of an example vehicle communications system according to the present disclosure.

Referring now to FIG. 2, a functional block diagram of an example implementation of the communications module 134 is presented. The communications module 134 may include memory 204, a connection control module 208, a wireless I/O interface 212, and a mode selection module 216.

The root certificate 220 may be stored in the memory 204. The root certificate 220 is a type of digital certificate. The root certificate 220 may include a protocol to be followed in establishing a secure connection with a server, a standard to be followed, a version of the protocol, a serial number (e.g., of the communications module 134), and a certificate authority (CA). The root certificate 220 may also include an indicator of a signature algorithm to be used, the issuer data string, the subject data string, a valid between (e.g., date and time) range, subject public key information, key usage information, basic constraints information, subject key identifier information, and/or other suitable data.

The issuer data string and the subject data string each include a CN entry. The protocol may be a transport layer security (TLS) protocol, a secure sockets layer (SSL) protocol, or another suitable type of cryptographic protocol. The standard may be X.509 and the version may be version 3, or another standard and/or version may be used.

The mode selection module 216 selects the current mode of operation of the vehicle 104 based on the CN entry of the predetermined data string of the root certificate 220. The current mode of operation may be one of the first mode and the second mode. The current mode of operation may alternatively be one or more other modes.

The mode selection module 216 selects the first mode as the current mode when the CN entry of the predetermined data string of the root certificate 220 is the same as the predetermined first mode CN 224. The mode selection module 216 selects the second mode as the current mode when the CN entry of the predetermined data string of the root certificate 220 is the same as the predetermined second mode CN 228. In various implementations, the predetermined first and second mode CNs 224 and 228, respectively, may be stored in the memory 204 or in another suitable location. The predetermined data string of the root certificate 220 may be the issuer string or the subject string. The mode selection module 216 generates a mode signal 232 that indicates the current mode of operation.

The connection control module 208 communicates with the first and second servers 150 and 154 via the wireless I/O interface 212 and the first antenna 158. The connection control module 208 selectively transmits a request 236 to establish a secure connection with one of the first and second servers 150 and 154, respectively. The process of establishing a secure connection between the connection control module 208 and a server may be referred to as a handshake procedure. The connection control module 208 may determine which one of the first and second servers 150 and 154, respectively, to transmit the request 236 to based on, for example, the status of a flag or an Internet Protocol (IP) address.

The one of the servers 150 and 154 transmits a server certificate 240 back to the connection control module 208. The server certificate 240 is also a type of digital certificate. The server certificate 240 includes the version, a serial number (e.g., of the one of the servers 150 and 154), and the certificate authority (CA). The server certificate 240 may also include an indicator of a signature algorithm to be used, an issuer data string, a subject data string, a valid between (e.g., date and time) range, subject public key information, key usage information, basic constraints information, subject key identifier information, and/or other suitable data. The issuer data string and the subject data string of the server certificate 240 each include a CN entry.

The connection control module 208 may generate a verification request 244 and transmit the verification request 244 to the CA (not shown). The connection control module may wait to receive a verification request response 248 from the CA before proceeding with the handshake procedure. The verification request response 248 may indicate whether the server certificate 240 is valid.

The connection control module 208 selects one of a first mode server certificate string 252 and a second mode server certificate string 256. The first and second mode server certificate strings 252 and 256, respectively, each include both a predetermined issuer CN and a predetermined subject CN. More specifically, the first mode server certificate string 252 includes a predetermined first mode issuer CN and a predetermined first mode subject CN. The second mode server certificate string 256 includes a predetermined second mode issuer CN and a predetermined second mode subject CN.

The connection control module 208 selects one of the first mode server certificate string 252 and the second mode server certificate string 256 based on the mode signal 232. The connection control module 208 selects the first mode server certificate string 252 when the mode signal 232 indicates that the first mode is the current mode of operation. The connection control module 208 selects the second mode server certificate string 256 when the mode signal 232 indicates that the second mode is the current mode of operation. The connection control module 208 may select another mode-specific server certificate string (not shown) when the mode signal 232 indicates that an associated mode is the current mode of operation.

The first and second mode server certificate strings 252 and 256, respectively, are stored in the memory 204. The first and second mode server certificate strings 252 and 256, respectively, may be non-modifiable in various implementations. In various implementations, the first and second mode server certificate strings 252 and 256, respectively, may be calibratable and may be modified via the I/O interface 130. One or more other mode-specific server certificate strings may also be stored in the memory 204 and may be non-modifiable or calibratable.

The connection control module 208 determines whether to continue with the handshake procedure based on the issuer and subject CNs of the server certificate 240. The connection control module 208 determines whether to continue with the handshake procedure further based on the predetermined issuer and subject CNs of the selected one of the first and second mode server certificate strings 252 and 256, respectively. The connection control module 208 continues with the handshake procedure when the issuer and subject CNs of the server certificate 240 are the same as the predetermined issuer and subject CNs of the selected one of the first and second mode server certificate strings 252 and 256, respectively. The connection control module 208 ends the handshake procedure when at least one of the issuer and subject CNs of the server certificate 240 are different than at least one of the predetermined issuer and subject CNs of the selected one of the first and second mode server certificate strings 252 and 256, respectively. The connection control module 208 may take one or more other actions when there is a difference, such as displaying a predetermined message on a display (not shown) of the vehicle 104.

Figure 3:
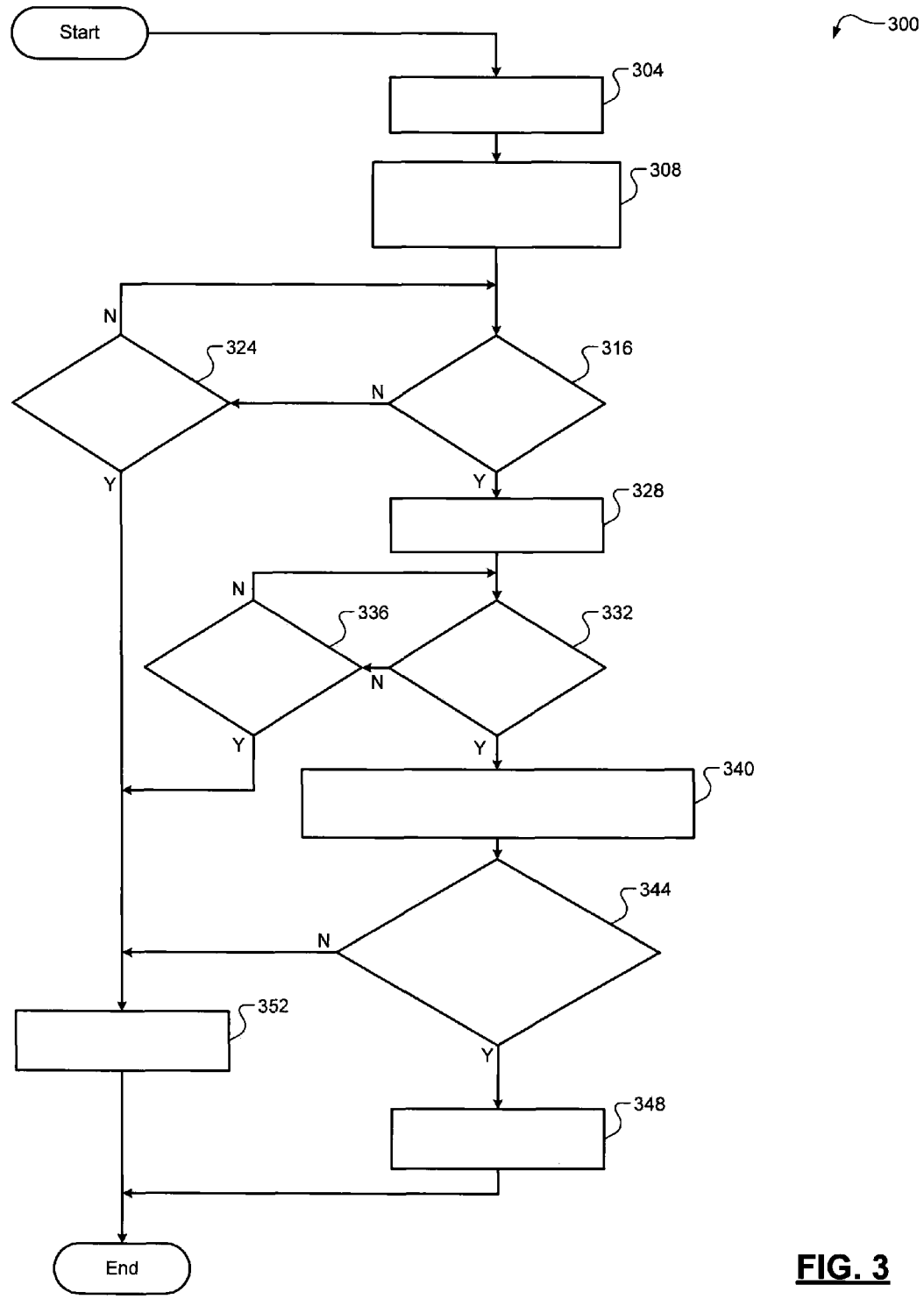
FIG. 3 is a flowchart depicting an example method of performing a portion of a handshake procedure between a vehicle and a server according to the present disclosure.

Referring now to FIG. 3, a flowchart depicting an exemplary method 300 of performing a portion of the handshake procedure between the communications module 134 and one of the first and second servers 150 and 154 is presented. Control begins at 304 where control determines the current mode of operation using the CN entry of the predetermined data string of the root certificate 220. Control determines that the current mode is the first mode when the CN entry of the predetermined data string of the root certificate 220 is the predetermined first mode CN 224. Control determines that the current mode is the second mode when the CN entry of the predetermined data string of the root certificate 220 is the predetermined second mode CN 228. The predetermined data string may be the issuer data string or the subject data string of the root certificate 220.

Control transmits the request 236 to establish a secure connection to one of the first and second servers 150 and 154 at 308. At 316, control determines whether the server certificate 240 has been received. If false, control may continue with 324; if true, control continues with 328. Control determines whether a timeout has occurred at 324. If true, control may proceed with 352, which is discussed further below. If false, control may continue with 316. A timeout may occur, for example, when a predetermined period passes after control transmits the request 236.

Control may send the verification request 244 to the CA at 328 and continue with 332. At 332, control determines whether the CA has verified that the server certificate 240 is valid. If false, control may continue with 336; if true, control may continue with 340. At 336, control may determine whether a timeout has occurred. If true, control may proceed with 352, which is discussed further below. If false, control may continue with 332.

At 340, control selects one of the first mode server certificate string 252 and the second mode server certificate string 256. Control determines whether the issuer CN and the subject CN of the server certificate 240 are the same as the issuer CN and the subject CN of the selected one of the first and second mode server certificate strings 252 and 256, respectively, at 344. If true, control continues with the handshake procedure at 348; if false, control continues with 352. At 352, control discontinues the handshake procedure.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A communication system of a vehicle, comprising:
   a mode determination module that sets a mode of operation to one of a vehicle production mode and a vehicle development mode based on a comparison of a common name (CN) of a root certificate with first and second predetermined CNs associated with operation in the vehicle production and vehicle development modes, respectively, wherein the CN is set to the vehicle development mode during vehicle development and set to the vehicle production mode when the vehicle is ready for public use; and
   a connection control module that selectively transmits a request to one of a first server and a second server to establish a secure wireless connection between the connection control module and the one of the first and second servers,
   wherein the first and second servers are different, and
   wherein the first and second predetermined CNs are different.

2. The communication system of claim 1 wherein the connection control module selects one of a first set and a second set of predetermined subject and issuer CNs based on the mode of operation, wirelessly receives a server certificate from the one of the first and second servers, and compares a subject CN and an issuer CN of the server certificate with the one of the first and second sets of predetermined subject and issuer CNs, and
   wherein the first and second sets of issuer CNs are different.

3. The communication system of claim 2 wherein the first and second sets of predetermined subject and issuer CNs are stored in a non-modifiable portion of memory of the vehicle.

4. The communication system of claim 2 wherein the first and second sets of predetermined subject and issuer CNs are stored in a portion of memory of the vehicle that is modifiable via wired connection to an input/output (I/O) interface of the vehicle.

5. The communication system of claim 2 wherein the connection control module discontinues the establishment of the secure wireless connection between the connection control module and the one of the first and second servers when the subject CN of the server certificate is different than the subject CN of the one of the first and second sets of predetermined subject and issuer CNs.

6. The communication system of claim 2 wherein the connection control module discontinues the establishment of the secure wireless connection between the connection control module and the one of the first and second servers when the issuer CN of the server certificate is different than the issuer CN of the one of the first and second sets of predetermined subject and issuer CNs.

7. The communication system of claim 2 wherein the connection control module continues with the establishment of the secure wireless connection between the connection control module and the one of the first and second servers when the subject and issuer CNs of the server certificate are the same as the subject and issuer CNs of the one of the first and second sets of predetermined subject and issuer CNs.

8. The communication system of claim 1 wherein the connection control module transmits the request to establish the secure wireless connection using a transport layer security (TLS) protocol.

9. The communication system of claim 8 wherein the connection control module transmits the request to establish the secure wireless connection using version 3 of the TLS protocol and an X.509 standard.

10. The communication system of claim 1 wherein the connection control module transmits the request to establish the secure wireless connection using a secure sockets layer (SSL) protocol.

11. A communication method for a vehicle, comprising:
    setting a mode of operation to one of a vehicle production mode and a vehicle development mode based on a comparison of a common name (CN) of a root certificate with first and second predetermined CNs associated with operation in the vehicle production and vehicle development modes, respectively, wherein the CN is set to the vehicle development mode during vehicle development and is set to the vehicle production mode when the vehicle is ready for public use; and
    selectively transmitting a request to one of a first server and a second server to establish a secure wireless connection between a connection control module of the vehicle and the one of the first and second servers,
    wherein the first and second servers are different, and
    wherein the first and second predetermined CNs are different.

12. The communication method of claim 11 further comprising:
    selecting one of a first set and a second set of predetermined subject and issuer CNs based on the mode of operation;
    wirelessly receiving a server certificate from the one of the first and second servers; and
    comparing a subject CN and an issuer CN of the server certificate with the one of the first and second sets of predetermined subject and issuer CNs,
    wherein the first and second sets of issuer CNs are different.

13. The communication method of claim 12 wherein the first and second sets of predetermined subject and issuer CNs are stored in a non-modifiable portion of memory of the vehicle.

14. The communication method of claim 12 wherein the first and second sets of predetermined subject and issuer CNs are stored in a portion of memory of the vehicle that is modifiable via wired connection to an input/output (I/O) interface of the vehicle.

15. The communication method of claim 12 further comprising discontinuing the establishment of the secure wireless connection between the connection control module and the one of the first and second servers when the subject CN of the server certificate is different than the subject CN of the one of the first and second sets of predetermined subject and issuer CNs.

16. The communication method of claim 12 further comprising discontinuing the establishment of the secure wireless connection between the connection control module and the one of the first and second servers when the issuer CN of the server certificate is different than the issuer CN of the one of the first and second sets of predetermined subject and issuer CNs.

17. The communication method of claim 12 further comprising continuing with the establishment of the secure wireless connection between the connection control module and the one of the first and second servers when the subject and issuer CNs of the server certificate are the same as the subject and issuer CNs of the one of the first and second sets of predetermined subject and issuer CNs.

18. The communication method of claim 11 further comprising transmitting the request to establish the secure wireless connection using a transport layer security (TLS) protocol.

19. The communication method of claim 18 further comprising transmitting the request to establish the secure wireless connection using version 3 of the TLS protocol and an X.509 standard.

20. The communication method of claim 11 further comprising transmitting the request to establish the secure wireless connection using a secure sockets layer (SSL) protocol.

* * * * *